June 18, 1935.  H. M. JENSEN  2,004,951
NAVIGATIONAL INSTRUMENT
Filed May 26, 1933
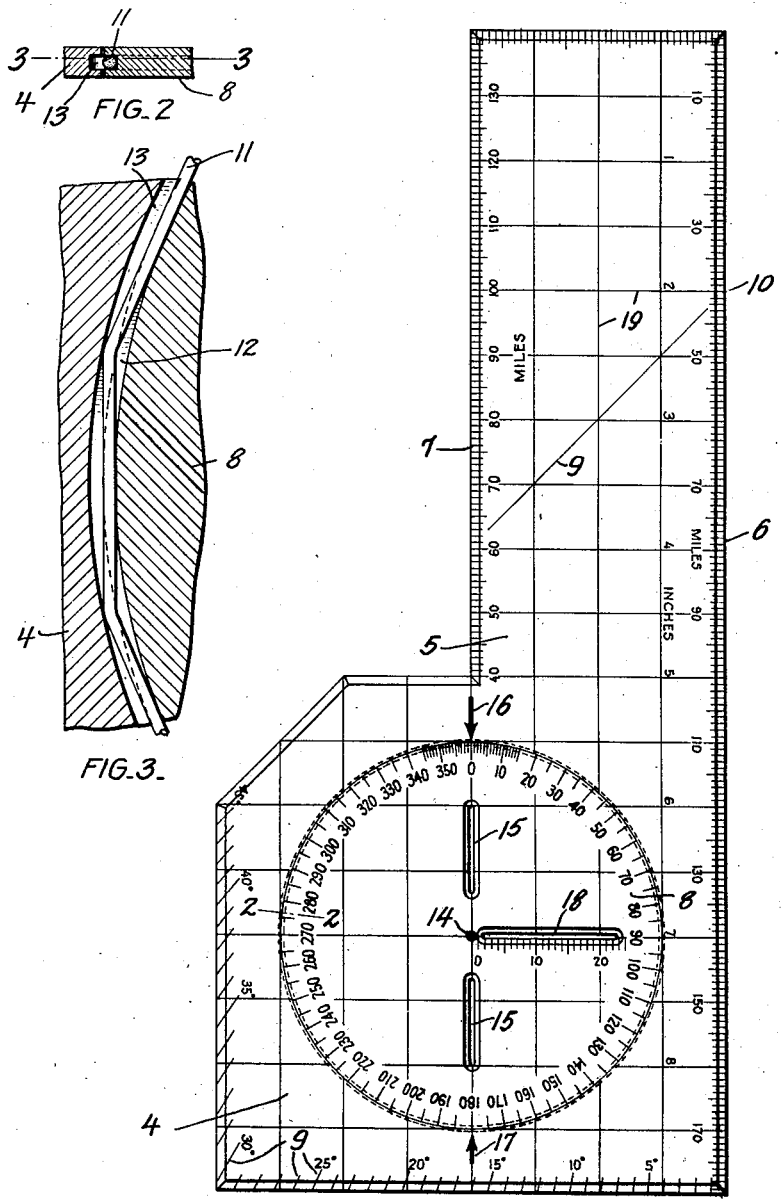
INVENTOR
Henry M. Jensen
BY
ATTORNEY Patented June 18, 1935

2,004,951

UNITED STATES PATENT OFFICE 2,004,951

NAVIGATIONAL INSTRUMENT

Henry M. Jensen, United States Navy

Application May 26, 1933, Serial No. 673,035

7 Claims. (Cl. 33—76)

(Granted under the act of March 3, 1883, as amended April 30, 1928; 370 O. G. 757)

This invention relates to a navigational instrument particularly adapted to use by aviators. It is the object of this invention to provide an instrument of the type mentioned that is cheap, convenient to use and applicable to the solution of problems involving courses and distances travelled by an aircraft and the determination of the angle of drift.

With the above and other objects in view, the invention consists in the construction, combination and arrangement of parts as will be hereinafter more fully described.

Reference is to be had to the accompanying drawing forming a part of this specification in which like reference characters indicate corresponding parts throughout the several views and in which:

Fig. 1 is a plan view of my invention;

Fig. 2 is a fragmentary sectional view on the line 2—2, Fig. 1;

Fig. 3 is a sectional view on the line 3—3, Fig. 2.

The body of the instrument is in general L-shaped, having a head portion 4 and a stem 5 extending therefrom in such position that one side of the stem and one side of the body form a continuous straight edge 6, which is calibrated to the same scale as the universal plotting sheets used by navigators, that is, twenty miles to the inch. The opposite edge 7 of stem 5 is similarly calibrated, with the zero point thereof at the center of a compass rose 8 that is rotatably mounted in head portion 4. A plurality of lines 9 lying on radii of a circle having its center at 10 make provision for use of the instrument as a large scale protractor.

Compass rose 8 is set in head 4 with its faces flush with the faces of the head portion and is retained therein by a resilient element 11 lying in grooves 12 and 13 cut into the periphery of the rose and the wall of the aperture in head 4, respectively, the element 11 being in light, yielding contact with the bottoms of both grooves. At the center of rose 8, which lies in the same straight line as edge 7 of the stem, is a hole 14 to permit making a mark on a chart to indicate the position thereof. Slots 15, lying on the same diameter of the rose 8 as the 0° and the 180° marks on the rose, may be set to fix the position of a line at right angles to any given line in finding a line of position. The points of arrows 16 and 17 indicate the position of the above mentioned diameter when it is in alignment with the edge 7 of stem 5.

A third slot 18 is formed in compass rose 8 and is provided with graduations to the same scale as that on edges 6 and 7. This slot, when set to indicate the wind, the direction of the wind movement being from the center of the rose outwardly along the slot, may be used as one side of a vector triangle representing heading and air speed, track and ground speed, and wind direction and velocity, the line along edge 7 and through the center of the rose forming another side of the triangle.

As an example of this use, suppose it to be required to make good one hundred miles on a course of 150° with a fifteen mile wind blowing from 20°, the air speed being 80 miles per hour. The zero mark on the compass rose is set at the point of arrow 16 and the instrument placed on the chart with edge 6 in a north-south direction; the rose is then pressed against the chart and the remainder of the instrument rotated around it until the 150° is opposite arrow 17 and then a line is drawn along edge 6, which defines the track. Compass rose 8 is then turned to set the 70° mark opposite arrow 17, in which position slot 18 lies along the wind direction, and the instrument is placed on the chart with edge 6 in a north-south direction and the calibration line representing 15 (the wind speed) on slot 18 on the line drawn to represent the track; then with the rose held stationary the body of the instrument is again rotated until the 80 mile line on edge 7 lies on the track line. If now a line be drawn along edge 7 and extended to center 14 and one be drawn from center 14 along slot 18 to intersect the track line the former will be the heading and air speed vector and the latter the wind vector. If necessary, any lines can be extended and the grid formed by lines 19 can be used to draw lines parallel to any other lines.

A rectangular grid 19 having longitudinal lines parallel to edge 6 is inscribed on the body of the instrument and on the compass rose. By means of this grid edge 6 may be aligned with the meridians of a chart. By holding the compass rose firmly against the chart any course can then be drawn from the center of the rose by rotating the body of the instrument until the arrow 16 points to the proper angle of the rose. Also, a certain course from a given point of the chart may be readily laid down by setting the arrow 16 or 17 opposite the desired course on the compass rose. Then place a pencil on the chart at the point of departure, place edge 6 against the pencil and rotate the body of the instrument until the longitudinal lines of the rectangular grid of the rotatable disc are parallel to a meridian or the cross lines to a parallel line drawn along edge 6 will then be the required course.

Many other uses for my invention will readily suggest themselves to those skilled in the art to which it is applicable.

It will be understood that the above description and accompanying drawing comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. A navigational instrument, comprising head and stem portions, both of transparent material, one edge of the stem portion lying in the same straight line as the corresponding edge of the head portion, the aforesaid edges and the opposite edge of the stem being calibrated to the same scale, a transparent compass rose rotatably mounted in said head portion with its center aligned with the said opposite edge and its surfaces flush with those of said head portion, there being two radial slots in said rose disposed on the same diametral line thereof and a third radial slot at right angles thereto, the third slot being calibrated to the aforesaid scale, and a resilient element disposed between the periphery of said rose and the adjacent portion of the said head to retain the rose in operative position.

2. A navigational instrument, comprising a head portion and a stem portion, both of transparent material, with one edge of each lying in a common straight line, the aforesaid edges and the opposite edge of the stem being calibrated to the same scale, and a transparent compass rose rotatably mounted in said body with its center aligned with the said opposite edge and its surfaces flush with those of said head, there being in said rose a calibrated radial slot settable to represent the wind vector in a triangle whereof the other sides are respectively the track and ground speed, and the heading and air speed of an aircraft one of which latter vector quantities may be simultaneously defined by an edge of said stem.

3. A navigational instrument, comprising a head portion and a stem portion, both of transparent material, with one edge of each lying in a common straight line, the aforesaid edges and the opposite edge of stem being calibrated to the same scale, and a member rotatably mounted in said head, there being in said member a radial slot calibrated to the said scale and settable to represent the wind vector in a triangle whereof the other sides are respectively the track and ground speed, and the heading and air speed, of an aircraft one of which latter vector quantities may be simultaneously defined by an edge of said stem.

4. A navigational instrument, comprising head and stem portions and a member movable with respect to both the said portions rotatably mounted in said head portion with its center aligned with an edge of said stem, there being in said member a radially extending slot settable to represent the wind vector in a triangle whereof the other sides are respectively the track and ground speed, and the heading and air speed, of an air craft one of which latter vector quantities may be simultaneously defined by an edge of said stem.

5. A navigational instrument, comprising head and stem portions, there being a circular aperture in said head with a groove in the wall of said aperture, a compass rose set in said aperture with its faces flush with the faces of said head portion and having a groove in its periphery, and resilient means seated in both of said grooves to press against both said rose and said head at the bottoms of both said grooves to retain said rose rotatably positioned in said head, the pressure so exerted by said resilient means being directed substantially radially of said rose.

6. A navigational instrument, comprising head and stem portions, there being a circular aperture in said head with a groove in the wall of said aperture, a compass rose set in said aperture with its faces flush with the faces of said head portion and having a groove in its periphery, the center of said rose being aligned with an edge of said stem, there being a radially extending slot in said rose settable to represent the wind vector in a triangle whereof the other sides are respectively the track and ground speed, and the heading and air speed, of an aircraft, another side of said triangle being defined by the said edge of the stem, and resilient means lying in both of said grooves to retain said rose rotatably positioned in said head.

7. A navigational instrument, comprising head and stem portions both of transparent material with one edge of each lying in a common straight line, the aforesaid edges and the opposite edges calibrated to the same scale, and a transparent compass rose rotatably mounted in the said body with its center aligned with the said opposite edge and its surfaces flush with those of said head, there being inscribed on the body and stem portions a rectangular grid whose longitudinal lines are parallel to the common straight line edge, and there being inscribed on the transparent compass rose disc a rectangular grid whose longitudinal lines are parallel to the line drawn from the 0° to 180° graduations, the rectangular grids aforesaid serving to align the respective parts of the instrument with meridians or parallels on a chart.

HENRY M. JENSEN.